(12) United States Patent
Winninger et al.

(10) Patent No.: US 7,247,110 B2
(45) Date of Patent: Jul. 24, 2007

(54) TOOL FOR MOUNTING A BELT IN A GROOVE OF A PULLEY

(75) Inventors: Alain Winninger, Tours (FR); Jean Claude Sedilleau, Chambray les Tours (FR); Jean-Jacques Robert, Monnaie (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 11/089,773

(22) Filed: Mar. 25, 2005

(65) Prior Publication Data

US 2005/0164815 A1    Jul. 28, 2005

Related U.S. Application Data

(62) Division of application No. 10/034,818, filed on Dec. 27, 2001, now Pat. No. 6,896,634, which is a division of application No. 09/388,900, filed on Sep. 2, 1999, now Pat. No. 6,497,832, which is a division of application No. 08/934,160, filed on Sep. 19, 1997, now Pat. No. 6,033,331.

(30) Foreign Application Priority Data

Sep. 20, 1996   (FR)   .................................. 96 11487

(51) Int. Cl.
F16H 7/22 (2006.01)
F16H 7/18 (2006.01)

(52) U.S. Cl. .................................................... 474/130
(58) Field of Classification Search ........ 474/129–131; 254/54, 100, 131, 250
See application file for complete search history.

(56) References Cited

U.S. PATENT DOCUMENTS

| | | | |
|---|---|---|---|
| 2,333,395 A | * | 11/1943 | Smith ........................ 474/130 |
| 2,470,810 A | | 5/1949 | Engard et al. |
| 2,505,216 A | | 4/1950 | Simmons et al. |
| 2,615,345 A | * | 10/1952 | Ross .......................... 474/130 |
| 2,621,529 A | | 12/1952 | Hawkins |
| 3,665,069 A | | 5/1972 | Richmond |
| 3,889,546 A | | 6/1975 | Houdret et al. |
| 4,435,180 A | | 3/1984 | Leeper |
| 4,466,331 A | | 8/1984 | Matheson |

(Continued)

FOREIGN PATENT DOCUMENTS

DE        4038465 A1    6/1992

(Continued)

*Primary Examiner*—Marcus Charles
(74) *Attorney, Agent, or Firm*—Alston & Bird LLP

(57) ABSTRACT

A tool for mounting a belt in a groove of a pulley of an automotive vehicle wherein the pulley has a rim and a flat lateral surface on each side of its groove. The tool includes a main body having an internal flat body surface and an external flat body surface; a flap provided on an edge of the main body and bent substantially at a right angle relative to the internal flat body surface and in the direction thereof. The tool also has a belt guiding area having substantially an arcuate shape and projecting substantially normally from the external flat body surface. The tool is useful for mounting a power transmission striated belt that includes an elastomeric matrix and a lengthwise supporting structure consisting of polyamide 4.6 twisted strands.

2 Claims, 3 Drawing Sheets

U.S. PATENT DOCUMENTS

| | | |
|---|---|---|
| 4,701,377 A | 10/1987 | Kurita et al. |
| 4,822,324 A | 4/1989 | Georget |
| 4,931,030 A | 6/1990 | Robecchi |
| 5,328,764 A | 7/1994 | McCullough et al. |
| 5,856,004 A | 1/1999 | Maatman et al. |
| 6,033,331 A | 3/2000 | Winninger et al. |
| 6,497,832 B1 | 12/2002 | Winninger et al. |

FOREIGN PATENT DOCUMENTS

| | | |
|---|---|---|
| EP | 285072 | 10/1988 |
| EP | 339249 | 8/1990 |
| EP | 381281 | 8/1990 |
| EP | 489298 | 6/1992 |
| EP | 507412 A1 | 10/1992 |
| EP | 625650 | 11/1994 |
| FR | 2610056 | 7/1988 |
| GB | 2003577 A | 3/1979 |
| JP | 03213402 A | 9/1991 |
| JP | 0811506 A | 1/1996 |

\* cited by examiner

TOOL FOR MOUNTING A BELT IN A GROOVE OF A PULLEY

CROSS-REFERENCE TO RELATED APPLICATIONS

This application is a divisional of application Ser. No. 10/034,818, filed Dec. 27, 2001, now U.S. Pat. No. 6,896,634, which is a divisional of application Ser. No. 09/388,900, filed Sep. 2, 1999, now U.S. Pat. No. 6,497,832, which in turn is a divisional of application Ser. No. 08/934,160, filed Sep. 19, 1997, now U.S. Pat. No. 6,033,331 granted Mar. 7, 2000.

BACKGROUND OF THE INVENTION

The present invention relates to a striated belt and, more particularly, to a V-profiled belt intended for automotive applications.

The Applicant markets striated belts with V-shaped teeth, the so-called adapted-modulus belts, which belts comprise polyamide 6.6 twisted strands and are intended for electric household appliances, such as linen washers and dryers.

Such belts have a stress-elongation diagram, which characterizes their modulus of elasticity and the average slope of which, between 1% and 10% of elongation, is substantially equal to 5.5 daN/ % of elongation, per belt width centimeter and per strand.

The belts are mounted, with a fixed distance between axes, by tensioning them and, once positioned, by releasing them (the so-called automatic mounting process or "snap-on").

Anyway, belts of this type but usable for automotive applications are not on the market at the present time.

As a matter of fact, the use of twisted strands in a striated belt intended for automotive applications, so as to transmit power between an engine and a receiving device, such as an alternator, means a number of problems, especially owing to the acyclic property of the engine output curve, this acyclic feature being sharper for four-cylinder engines than for six- or eight-cylinder engines and being quite greater in diesel engines than in gasoline engines.

Since the electrical power requirements of automotive vehicles tend to increase at present (air conditioning, etc.), the amperage of alternators has to be increased too, and therefore their inertia, which increases proportionately the stresses imposed upon the belts.

SUMMARY OF THE INVENTION

Accordingly, it is an object of the present invention to provide a belt for a motor vehicle, which exhibits a long service life even under high loads.

It is another object of the present invention to provide a belt capable of operating with engines having a marked acyclic feature.

It is still another object of the present invention to provide a belt for a motor vehicle, allowing the filtering out of the high-order harmonic components of the speed and voltage signal output by the receiving device, more particularly when the latter is an alternator.

It is another object of the present invention to provide a belt capable of being incorporated in a drive system between a driving shaft and a driven shaft, by means of an automatic mounting operation ("snap-on"), advantageously without requiring a fixed tightener.

To achieve at least some of the above objects, there is provided a power transmission striated belt which includes an elastomeric matrix and a lengthwise supporting structure consisting of polyamide 4.6 twisted strands, characterized in that the supporting structure is selected so that the stress-elongation diagram of the belt exhibits an average slope ranging from 12 to 20 daN/ % of elongation per width centimeter and per strand, and in that the twisted strands are wound with a very small nominal tension, or almost without any tension, and in that the curing operation and the cooling operation after curing are carried out without any belt tensioning. More particularly, the average slope may range from 12 to 15 daN/ % of elongation per width centimeter and per strand.

It should be noted that patent application U.S. Pat. No. 4,701,377 and European Patent Application EP-381 281 relate to a striated belt, in which the high elastic modulus twisted strands are made of polyamide 4.6, but these documents do not suggest using such twisted strands for a low-modulus belt.

As a matter of fact, it should be observed that the average slope of the useful domain of the elongation curve is in the order of 30 daN/ % of elongation per width centimeter and per strand for the motor vehicle belts known at present. Besides, the ultimate elongation of such belts is generally below 10%.

According to the present invention, the average slope, between 1% and 10% of elongation, is preferably substantially equal to 17 daN/ % of elongation per width centimeter and per strand.

The belt is advantageously characterized in that its length, as measured on a test bench according to the ISO Standard 9981, is lower by 1%–6% and, for instance, by 1%–5% or by 1%–4%, than the nominal length of the drive system.

In a preferred embodiment, the length of the belt, as measured on a test bench, is lower by 2%–3%, than the nominal length of the drive system, the preferred value being substantially equal to 2%.

Advantageously, the belt has a stable operating tension ranging from 14 to 20 daN/width centimeter/strand and, more preferably, ranging from 14 to 17 daN/width centimeter/strand.

The twisted strands of the belt have a diameter d preferably ranging from 0.7 to 1.3 mm.

The space between twisted strands ranges advantageously from 0 (close-turn lay) to 4d, and preferably from 0 to 2d.

The invention also relates to a manufacturing method for the above-mentioned belt, characterized by the following steps:

a) forming, for instance on a drum, a belt blank, such step including the helical winding of twisted strands at a nominal tension either very low or almost null;

b) curing the blank without subjecting it to any mechanical tensioning;

c) allowing the cured blank to cool down without subjecting it to any mechanical tensioning;

d) cutting the cured blank into individual belts.

The invention also relates to a method of the so-called "automatic" type for mounting the belt onto a pulley of a drive system. It is characterized by the following steps:

i) positioning a mounting tool close to the pulley, so that at least a radial thrust area of the mounting tool rests against the pulley girth, the mounting tool including a ramp area extending from the groove of the pulley to a downward area, for the guidance of the belt right from the groove while keeping it away from the pulley till it reaches a plane spaced from the pulley face;

ii) radially moving the mounting tool by a lever effect, while following the pulley girth so as to fit the belt into the groove of the pulley while pulling on it;

iii) once the belt is positioned in the groove, disengaging the mounting tool.

The invention also relates to a tool for mounting a belt in a groove of a pulley of an automotive vehicle, the pulley having a rim and a flat lateral surface on each side of its groove. The tool comprises a main body having an internal flat body surface and an external flat body surface; a flap provided on an edge of said main body and bent substantially at a right angle relative to said internal flat body surface and in the direction thereof; and a belt guiding area having substantially an arcuate shape and projecting substantially normally from said external flat body surface.

BRIEF DESCRIPTION OF THE DRAWINGS

Other features and attendant advantages of the present invention will more easily be understood by reading the following description of the preferred embodiment thereof, only by way of a non-limitative example, taken in conjunction with the accompanying drawings wherein.

DETAILED DESCRIPTION OF THE INVENTION

Figure 1:
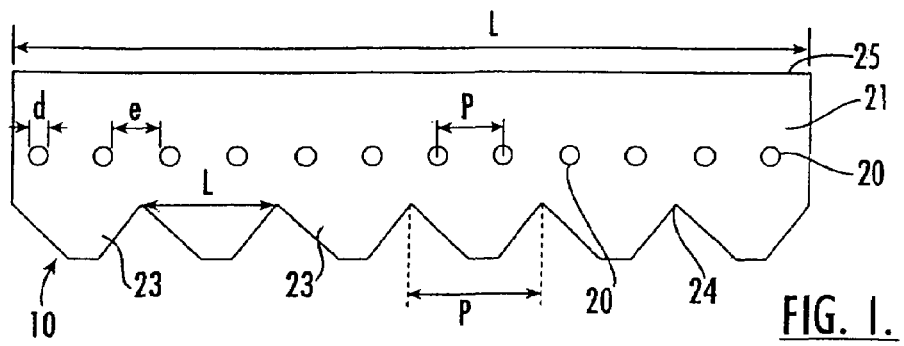
FIG. 1 is a cross-sectional view of a striated belt according to the present invention.
Figure 2:
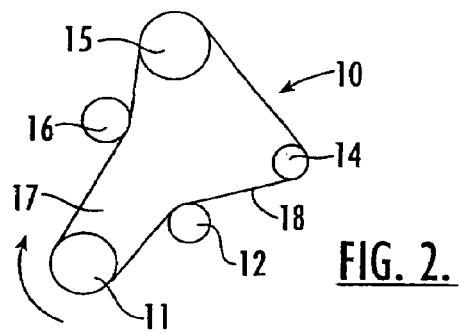
FIG. 2 shows a drive system provided with a belt according to the present invention.

An endless belt 10 comprises a lengthwise supporting structure 20 of twisted strands embedded in an elastomeric matrix 21, such as a mixture of polychloroprene rubber or natural rubber or any type commonly known in the manufacture of power drive endless belts, for its good adhesion properties. Such belt is advantageously of the "striated" type, i.e. its inner surface 22 is shaped like teeth 23, the pitch P of which is standardized, as well as their triangular cross-section as shown (V belt) or their trapezoidal cross-section, each reference character H, J, K, L and M in the ISO Standard 9981 also defining the belt thickness, as measured between the tooth bottom 24 and the outer surface of the belt. The belt 10 cooperates with pulleys 11, 12, 13, 14, 15, 16, etc., the rims of which have a profile conjugate with that of teeth 23, that is they have grooves arranged in the same way and with a cross-section which is similar to that, e.g. triangular or trapezoidal, of the teeth 23, which they receive when the drive system is operating. The belt 10 comprises two strands 17 and 18.

The V-shaped belts intended for automotive drive systems generally have six teeth with a width l=3.56 mm, i.e. a total belt width L of 21.36 mm.

According to the present invention, the twisted strands are made up of adipamide polytetramethylene or polyamide 4.6.

These are resins prepared by polycondensing 1.4-diaminobutane and adipic acid, for instance those marketed under the name of STANYL by the DSM Company. Such resins in the shape of yarns are then prepared into twisted strands.

Therefore, belts usable under severe operating conditions, such as those prevailing in drive systems for automotive applications, can be obtained by selecting the twisted strand size and pitch p for the belt to exhibit a stress-elongation diagram having, for instance between 1% and 10% of elongation, an average slope in the range from 12 daN/ % of elongation per width centimeter and per strand to 20 daN/ % of elongation per width centimeter and per strand, and preferably substantially equal to 17 daN/ % of elongation per width centimeter and per strand.

The slope may, more preferably, range from 12 and 15 daN % of elongation per width centimeter and per strand.

Besides, the method for manufacturing belts according to the invention differs from that implemented in conventional belts for automotive applications, wherein the twisted strands are kept tensioned during the whole manufacturing process.

In the conventional method, the twisted strands are first stretched and then helically wound onto the drum carrying the gum sheets.

The tensioned twisted strands in the winding condition are still under tension when the blank is cured. For such curing, the blank is generally arranged in a mold shaped like the belts to be produced, and then it is pressed by radial expansion onto the inner wall of the mold. Such radial expansion increases the tension of the twisted strands.

The tension disappears at the end of the curing process, when the blank is extracted from the mold and such tension cancellation results in shrinkage and thus in a smaller length of the belt.

In order to avoid such shrinkage, in the conventional method, the twisted strands are tightened upon cooling from the curing temperature down to the ambient temperature, which means that they retain their length and that all shrinkage is prevented.

Such method has a number of consequences:

when the belt has been mounted, the operating temperature fluctuations result in length changes and, more especially when its temperature increases, the belt is brought back to its initial state, and the twisted strands tend to shorten, which results in an increase in the service stresses in the belt.

As the belt temperature is decreasing, the length tends to increase and the belt slacks, which phenomena is even aggravated by the permanent strain resulting from the twisted strand creep.

On the contrary, when a belt is manufactured according to the present invention, the twisted strands are helically wound on a drum carrying gum sheets at a nominal tension which should ideally be null but which, in practice, is very low or almost null, corresponding to a winding operation under the lowest possible tension, being understood that some very low or almost null (e.g. below 5 N) residual stresses always remain, which fact cannot be avoided if only owing to the stresses resulting from the weight of the twisted strands.

Afterwards, during the pressure curing process, the blank is pressed onto the inner wall of the mold without any radial expansion and therefore the twisted strands present an almost null residual stress.

After extraction and during the cooling process, the blank cools down without being tensioned. Once the cooling is over, the twisted strands present no tension at all.

Thus, an advantage of a belt according to the invention resides in that the operating temperature fluctuations have much less influence on the belt that when the conventional method is implemented. Such smaller changes in the belt length as a function of temperature also result in a lower tension change, which prevents the belts from slipping on the pulleys, and reduces the generated noise.

One major problem in automotive applications is the acyclic feature owing to the nonuniform time distribution of the alternating piston loads. This leads to a severe stressing of the belts and, more particularly, to a residual stress after stabilization (that is after some operating period) which is quite lower than in the case of drive systems without an acyclic feature, such as the drive systems from an electric motor.

Owing to such severe stresses, up to now it has not been possible to provide belts having an elastic modulus suitable for the so-called automatic mounting of the belt in a car drive system.

Most remarkably, the belts according to the present invention, which have an average slope ranging from 12 to 20 daN/ % of elongation per width centimeter and per strand, exhibit a stable operating tension after about ten hours of operation, which is in the order of 14 to 20 daN per width centimeter and per strand.

Good results are obtained with twisted strands having a diameter ranging from 0.7 to 1.3 mm, the distance between twisted strands being in the range from 0 to 4d, and preferably in the range from 0 to 2d.

Figure 3A:
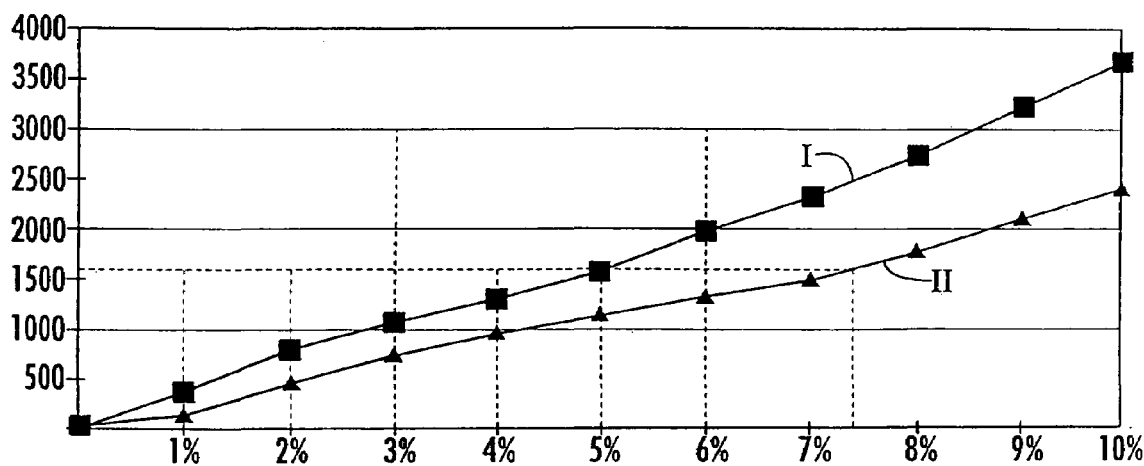
FIG. 3a is a stress-elongation diagram corresponding, respectively, to a belt according to the present invention (Curve I) and to a belt (Curve II) not suitable for the present invention, as obtained on a test bench schematically shown in FIG. 3b.

FIG. 3a shows the case of two driving belts in the automotive field, comprising six 3.56 mm-wide teeth and polyamide 4.6 twisted strands 20, manufactured according to the above-mentioned method (winding under an almost null nominal tension, curing and cooling without tensioning).

The belt according to Curve I (twisted strands, 470 dtex X 6×3) has an average slope, between 1% and 10% of elongation (curve drawn using the least-squares method), which amounts to 17 daN/ % of elongation per width centimeter and per strand.

The belt corresponding to Curve II has an average slope, between 1% and 10% of elongation, which amounts to 11 daN/ % of elongation per width centimeter and per strand.

Figure 3B:
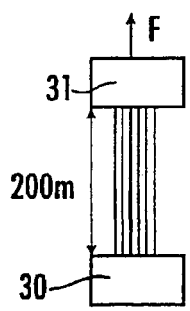

The elongation test, used for such diagrams, is carried out, for instance, on a 200 mm-long strand retained between two jaws, the one 30 being stationary and the other 31 being movable, using a dynamometer (refer to FIG. 3b).

The sole object of the above-mentioned average slope is to provide a characteristic value for the stress-elongation diagrams, obtained by means of the least-squares method, but such curves should in no way be regarded as straight lines since, as a matter of fact, at each point they do have a slope, the value of which varies appreciably along the curve.

A car belt according to Curve I and comprising six 3.56 mm-wide teeth has been mounted onto a drive system without any fixed tighteners. The mounting operation has been performed by stretching the belt to fit it onto the pulleys of the drive system. Once released, the belt is in position with a 2% elongation, which corresponds to an initial elongation force of 80 daN per strand (refer to Curve I), that is substantially 13 daN per tooth and per strand. After a few hours of operation, the stabilized tension has been measured. Its value amounted substantially to 6 daN per tooth and per strand. Such tension remains stable and the belt exhibits a long service life.

A car belt according to Curve II and comprising six 3.56 mm-wide teeth has been mounted onto a drive system without any fixed tighteners. The mounting operation has been performed by stretching the belt to fit it onto the pulleys of the drive system.

After a few hours of operation, the stabilized tension has been measured. Its value was quite below 6 daN per tooth and per strand, and the belt was inclined to slip on the pulleys, which generated noise and the service life of the belt was not very satisfactory.

Another restraint should be taken into account, especially as regards the filtering properties concerning the high-order harmonic components of the speed and voltage signal output by the receiving device. Such phenomena is more particularly marked when high inertia are present, i.e. when the motor vehicle is provided with an alternator.

Figure 4A:
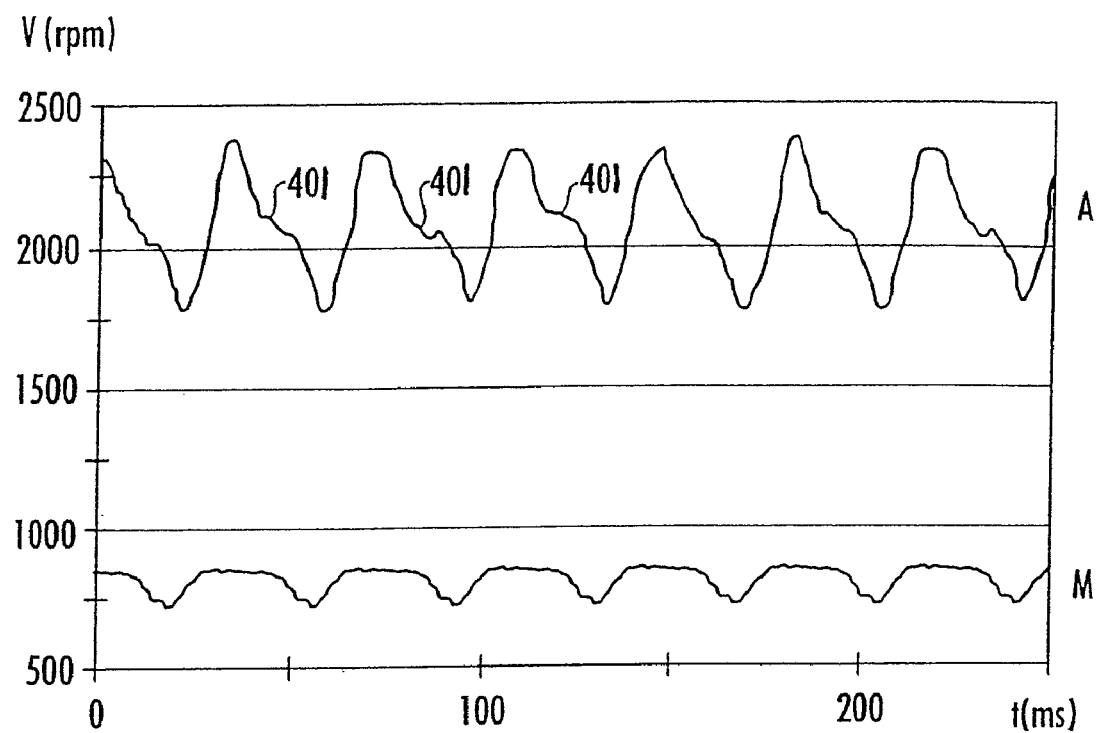
FIGS. 4a and 4b show the comparative drive testing of a car alternator using a belt according to the prior art and to the present invention, respectively.
Figure 4B:
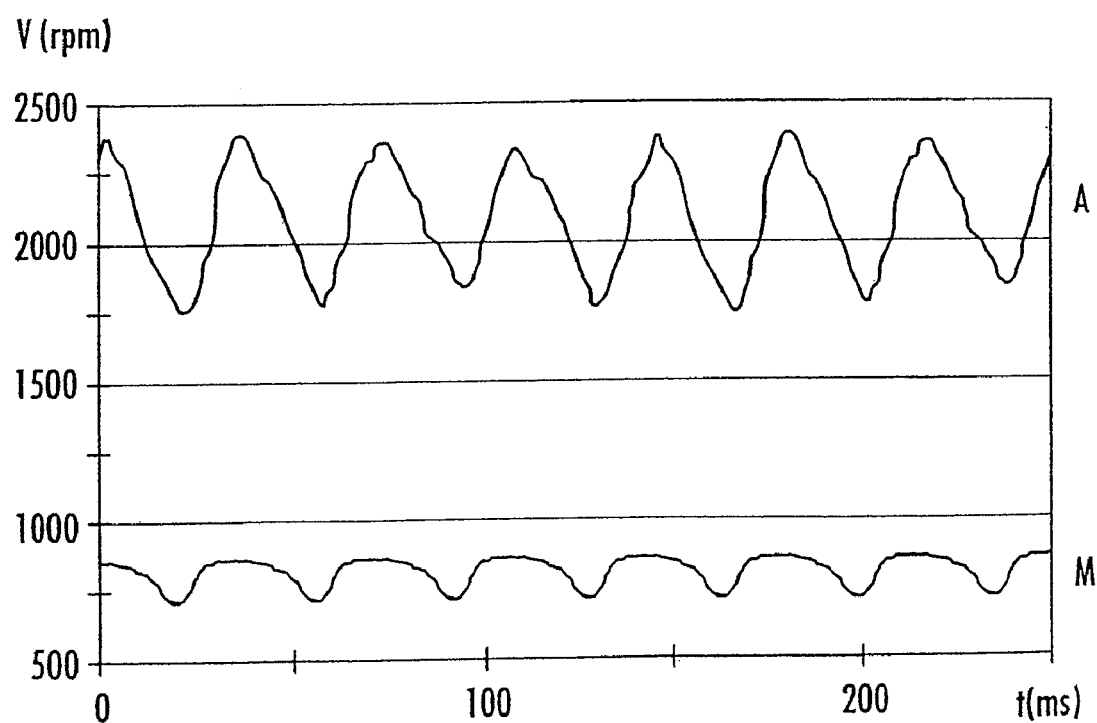

FIGS. 4a and 4b illustrate this filtering phenomenon. Each one shows, in terms of time, the rotation speed of the main shaft (Curve M), here that of a diesel engine at idle speed, and that of the shaft (Curve A) of a receiving device 14. The belt 10 transmits the speed, resulting from the rotation of the pulley 11, to pulleys 12, 14, 15 and 16 of the receiving devices, more particularly the pulley 14, which drives the alternator having a torque of $3.5 \; 10{-}3 \; kg.m^2$.

Curve A in FIG. 4a has been obtained by means of a conventional belt, comprising polyester twisted strands, after a 48-hour operating time, the belt having reached a stabilized operating tension.

It can be seen that Curve A shows a repetitive anomaly 401 having a more or less stable shape and corresponding to a slope interruption during deceleration. Such anomaly originates more particularly in the fact that the belt passes over to the pulley 14 the acyclic operation of the engine (cf. Curve M). This phenomena is all the more marked as the engine has a more acyclic property. By way of information, a four-cylinder gasoline engine has an acyclic property in the order of 6–7%. Such property is in the order of 4–5% for a six-cylinder gasoline engine, but it ranges generally from 10 to 15% for a diesel engine. Some diesel engines even have an acyclic property as high as 20–25%. The anomalies 401 are due to the conjugate effect of the engine acyclic property and of the receiving device inertia, and they increase with the acyclic value of the engine and with the inertia of the receiving device.

The curve shown in FIG. 4b has been obtained using a belt according to the invention, and corresponding to Curve I in FIG. 3a, after a 48-hour operating period. The belt has reached a stabilized operating tension of 15 daN per width centimeter and per strand. It can be seen that the anomaly 401 has completely disappeared. The belt according to the invention has the quite remarkable property of being capable of filtering the high-order harmonic components of the speed signal output by the receiving device.

The suppression of such anomalies 401 means a longer service life of the belt.

Figure 5A:
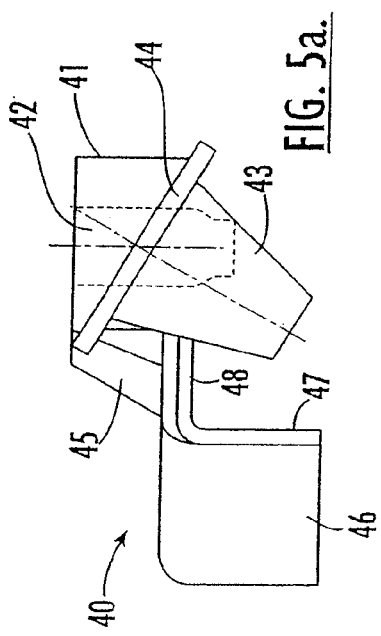
FIGS. 5a and 5b show a preferred embodiment of a mounting tool, capable of performing the automatic fitting of a belt according to the present invention.
Figure 5B:
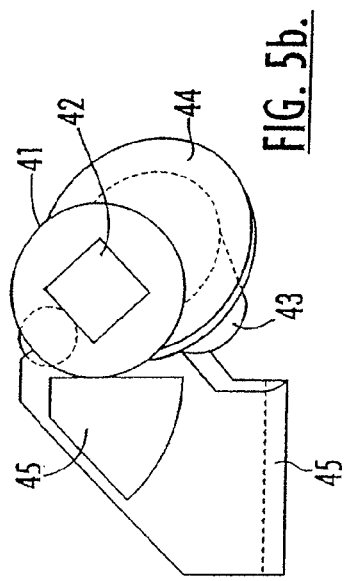
Figure 6:
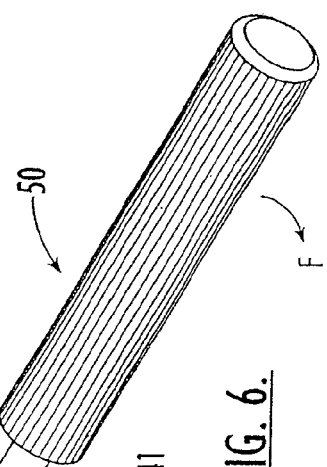
FIG. 6 illustrates the method for mounting the belt.
Figure 6:
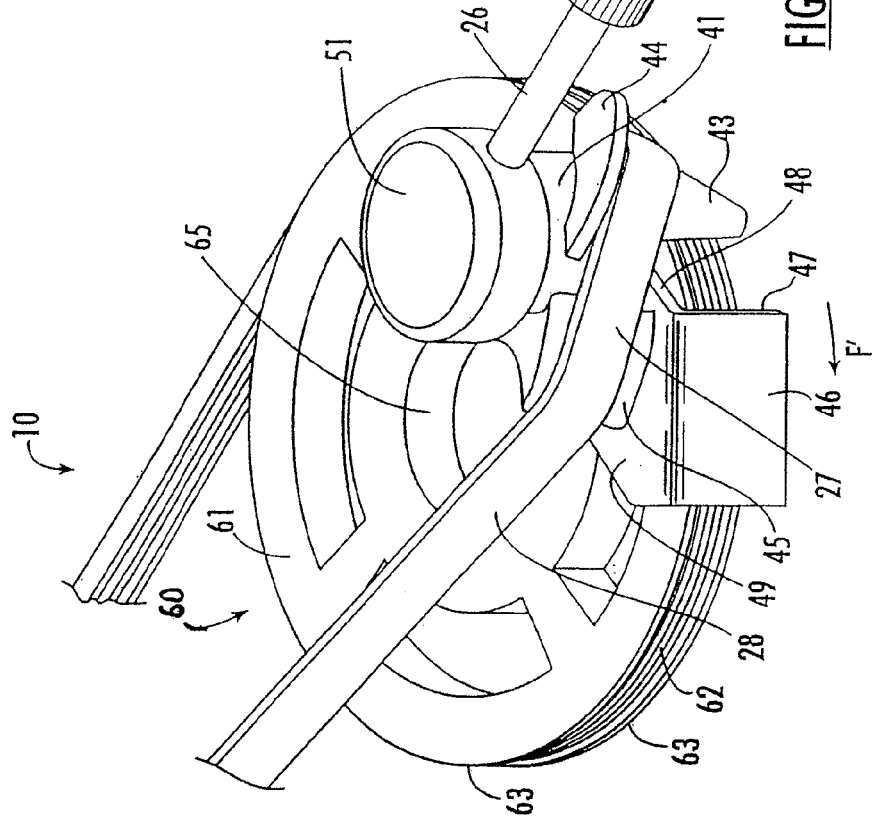

The automatic mounting of a belt into a car drive system involves high tensile stresses. The mounting operation may be performed more easily by means of the tools to be described with reference to FIGS. 5a, 5b and 6. The mounting tool 40, shown in detail in FIGS. 5a and 5b, has a central part 41 provided with a square opening 42 for receiving a complementary part 51 of an actuating wrench 50. It should be noted that the lever 50 may be an integral part of the tool 40. The tool 40 has an inclined conical part 43, at the top end of which a guiding flat surface 44 is provided, and a L-shaped member having a leg 49 extending from the central part 41 and whose flat underside 48 is intended to rest on the surface 61 of the pulley 60, and an end flap 46 bent substantially at right angle in relation to the leg 49, and the inner surface 47 of which abuts against the rim 63 of the pulley 60.

The leg 49 is crowned by a guiding area 45 substantially in the shape of an arc of a circle.

The object of the method according to the invention consists in fitting the belt by a lever effect, using the mounting tool 40, which is guided along the girth (62, 63) of the pulley 60, whether the latter remains fixed or is capable of rotating about a driving shaft received in its central opening 65.

The conical part 43, bounded by the inclined flat surface 44, and the part 45 make it possible to guide, by a ramp effect, the side portion 27 of belt 10 from the side portion 26 already accommodated in the groove 62 of the pulley 60, up to the side portion 28, which stands apart from the surface 61. This is performed by bearing on the lever 50.

The procedure is as follows. The tool 40 is positioned so that the surface 48 of the leg 49 rests on the surface 61 of the pulley 60, and that the conical part 43 and the surface 47 of the flap 46 abut against the girth of the pulley 60, that is the rim 63. Of course, it would be possible to obtain such thrust effect by pressing the tool 40 into the groove 62 of the pulley 60.

The belt 10 is prepositioned in the ramp constituted by parts 43, 44 and 45. By operating the lever 50 in the direction of arrow F, the tool 40 is moved along the girth of the pulley 60 in the direction of arrow F', which results in the fitting of the belt 10 into the groove 62.

Should the pulley 60 be fixed, such travel of the tool 40 is performed with a sliding motion. If the pulley 60 is capable of rotating, such travel of the tool 40 attends the rotational motion of the pulley 60. Anyhow, the lever effect combined with the ramp effect provide an easy fitting.

More particularly, such mounting operation takes place in the plane of the pulley 60 or close to it, which results in the fact that this method is suitable for an exchange in the engine compartment, usually of limited accessibility in automotive vehicles.

That which is claimed is:

1. A tool for mounting a belt in a groove of a pulley of an automotive vehicle, said pulley having a rim and a flat lateral surface on each side of its groove, comprising:
    a main body having an internal flat body surface and an external flat body surface;
    a flap provided on an edge of said main body and bent substantially at a right angle relative to said internal flat body surface and in the direction thereof;
    a belt guiding area having substantially an arcuate shape and projecting substantially normally from said external flat body surface; and
    an inclined flat surface on at least part of the length of an external side of the belt guiding area.

2. A tool as in claim 1, wherein said belt guiding area is substantially in the shape of an arc of a circle.

* * * * *